United States Patent
Brazil et al.

(10) Patent No.: US 6,537,033 B2
(45) Date of Patent: Mar. 25, 2003

(54) OPEN LOOP CONTROL APPARATUS FOR VACUUM CONTROLLED SYSTEMS

(75) Inventors: Lionel H. Brazil, Tulare, CA (US); Donald Jackson, Santa Ana, CA (US)

(73) Assignee: Western Dairies Incorporation, Tulare, CA (US)

( * ) Notice: Subject to any disclaimer, the term of this patent is extended or adjusted under 35 U.S.C. 154(b) by 0 days.

(21) Appl. No.: 09/827,685

(22) Filed: Apr. 6, 2001

(65) Prior Publication Data

US 2002/0034447 A1 Mar. 21, 2002

Related U.S. Application Data

(60) Provisional application No. 60/196,572, filed on Apr. 11, 2000.

(51) Int. Cl.$^7$ ............................................. F04B 49/00
(52) U.S. Cl. ........................ 417/26; 417/44.1; 417/279; 137/907; 119/14.01
(58) Field of Search ........................... 417/26, 44.1, 45, 417/279, 307, 42; 119/14.01, 14.02, 14.25, 14.43, 14.44; 137/488, 487.5, 907

(56) References Cited

U.S. PATENT DOCUMENTS

| | | | |
|---|---|---|---|
| 2,667,856 A | | 6/1954 | Heckendorf ............... 119/14.44 |
| 3,482,593 A | | 12/1969 | Heimann et al. ............ 137/512 |
| 3,527,241 A | | 9/1970 | Bristow et al. ................ 137/98 |
| 3,583,779 A | | 6/1971 | Surls et al. ...................... 312/1 |
| 3,938,547 A | * | 2/1976 | Jones ............................ 137/488 |
| 3,982,553 A | | 9/1976 | Johnson et al. ................ 137/81 |
| 4,011,838 A | * | 3/1977 | Nordegren et al. ....... 119/14.08 |
| 4,166,476 A | | 9/1979 | Yamamaka et al. .......... 137/103 |

(List continued on next page.)

OTHER PUBLICATIONS

*Adjustable Speed Drive for Dairy Vacuum Pumps*, pp. 1–6 Published by, the EPRI Industrial & Agriculture Business Unit– No. 2, 1996 (the "EPRI Reference").

*Smart Technology for Vacuum Pump Control Saves Money and Reduces Noise; Sales Brochure*, Sides 1 and 2, DLtech, Inc., 1997 (the "DLtech Reference").

Primary Examiner—Charles G. Freay
Assistant Examiner—Han L. Liu
(74) Attorney, Agent, or Firm—Daniel J. Meaney, Jr.

(57) ABSTRACT

An open loop feedback control apparatus for a vacuum controlled system for providing vacuum stability within a predetermined range of vacuum levels is shown. The open loop feedback control apparatus includes a vacuum regulator having a diaphragm including a valve member having a valve opening or input port which changes position as a function of the vacuum level within the vacuum system for controllably admitting or bleeding air into the vacuum system to adjust the vacuum level within the vacuum system. A transducer is operatively coupled to the diaphragm for producing an output signal which represents an instantaneous position of any one of the diaphragm valve member, valve opening or input port. A control device having a pair of inputs and an output has applied to one of the pair of inputs a set point signal representing a programmed vacuum level for the vacuum system and has applied to the other of the pair of inputs the output signal from the transducer representing an instantaneous position of any one of the diaphragm valve member, valve opening or input port. The control device produces on its output a control signal for controlling speed of a variable speed motor which drives a vacuum pump at various speed as required to enable the vacuum pump to maintain the vacuum level of the vacuum system within a predetermined range of vacuum levels.

15 Claims, 6 Drawing Sheets

U.S. PATENT DOCUMENTS

| | | | |
|---|---|---|---|
| 4,191,090 A | 3/1980 | Freiberger et al. | 91/52 |
| 4,273,154 A | 6/1981 | Moldenhauer et al. | 137/490 |
| 4,944,249 A | 7/1990 | Takeuchi | 137/470 |
| 4,955,408 A | 9/1990 | Meermoller | 606/46 |
| 4,966,528 A * | 10/1990 | Henkel et al. | 417/63 |
| 5,141,403 A | 8/1992 | Guo et al. | 471/45 |
| 5,249,932 A * | 10/1993 | Van Bork | 417/386 |
| 5,284,180 A | 2/1994 | Guo et al. | 137/488 |
| 5,373,822 A * | 12/1994 | Thompson | 123/520 |
| 5,813,426 A * | 9/1998 | Tan et al. | 137/14 |
| 5,845,599 A * | 12/1998 | Bova et al. | 119/14.08 |
| 5,960,736 A * | 10/1999 | Ludington et al. | 119/14.08 |

\* cited by examiner

OPEN LOOP CONTROL APPARATUS FOR VACUUM CONTROLLED SYSTEMS

CROSS-REFERENCES TO RELATED APPLICATIONS

This Application claims the benefit, under Title 35, United States Code §119(e), of U.S. Provisional Patent Application Ser. No.: 60/196,572 filed Apr. 11, 2000.

STATEMENT REGARDING FEDERALLY SPONSORED RESEARCH OR DEVELOPMENT

Not Applicable

REFERENCE TO A "MICROFICHE APPENDIX" (SEE 37 CFR 1.96)

Not Applicable

BACKGROUND OF THE INVENTION

1. Field of the Invention

This invention relates to an open loop control apparatus for a vacuum controlled system for providing vacuum stability within a predetermine range of vacuum levels and more particularly relates to a vacuum relief regulator for use in a vacuum controlled milking system wherein the vacuum relief regulator includes a transducer for producing output signal which is applied to a control device for producing a control signal for controlling speed of a variable speed motor which drives a vacuum pump at various speeds to maintain enough vacuum reserve to allow efficient vacuum relief operation thereby maintaining the vacuum level of the vacuum system within a predetermined range of vacuum levels.

2. Description of the Prior Art

Vacuumed controlled milking systems are well known in the prior art. Typical vacuum controlled milking are disclosed in U.S. Pat. Nos. 5,141,403; 5,284,180 and 4,011,838.

U.S. Pat. Nos. 5,141,403 and 5,284,180 disclose a low-energy-consuming apparatus and method for controlling vacuum levels in milking machines. The milking machine includes a high vacuum reserve including an adjustable speed drive motor driving a vacuum pump, a low-vacuum reserve which operates the milking appears, and a dual vacuum controller. The dual vacuum controller senses vacuum disturbances in the low-vacuum end and adjusts the flow rate of air from the low-vacuum end to the high vacuum reserve. The high vacuum reserve portion of the apparatus includes a vacuum transducer which senses the vacuum in the high volume reserve which varies in response to the vacuum level in the low-vacuum-reserve, to control the speed of the adjustable speed motor thereby providing a controlled vacuum level with minimum pressure variance and energy savings due to a reduction in demand.

U.S. Pat. No. 4,011,838 discloses a milking machine system which includes a flow rate sensing device, a timing device and a system control means for varying the character of the working and massage vacuums during the milking process. The system uses a conventional vacuum pump and vacuum regulator.

U.S. Pat. Nos. 4,955,408; 4,944,249; 4,273,154; 3,938,547; 3,482,593 and 2,667,856 disclose various vacuum regulator devices which utilize a diaphragm and air ports for controlling vacuum levels in a typical milking system.

U.S. Pat. Nos. 4,191,090; 4,166,476; 3,982,553; 3,583,779 and 3,527,241 disclose various vacuum-pressure regulating devices and pressure regulating devices which utilize a diaphragm for controlling vacuum or pressure levels in a vacuum or pressure system requiring controlled vacuums or pressures. U.S. Pat. No. 4,191,090 discloses the use of an elecro-mechanical transducer located in a vacuum line and separate from a vacuum regulator.

None of the vacuum regulators or systems using vacuum regulators anticipate, disclose, teach or suggest affixing a transducer, such as for example a linear stroke transducer, which produces an output voltage which varies linearly as a function of the displacement of the diaphragm within or inside of the mechanical vacuum controller, to sense the movement of the diaphragm.

In addition, two references which disclose vacuum controlled milking systems having variable or adjustable drive motors for driving a vacuum pump at controlled speeds are: (1) *Adjustable Speed Drive for Diary Vacuum Pumps*, Pages 1–6 Published by, the EPRI Industrial & Agriculture Business Unit—No. 2, 1996 (the "EPRI Reference"); and (2) *Smart Technology for Vacuum Pump Control Saves Money and Reduces Noise*; Sales Brochure, Sides 1 and 2, Dltech, Inc., 1997 (the "DLtech Reference"). The EPRI Reference appears to disclose the same information subject of U.S. Pat. Nos. 5,141,403 and 5,285,180 discussed above.

The Dltech Reference discloses use of a sensing system which functions as a vacuum control in a milking system by controlling the speed of a variable speed frequency motor which drives a vacuum pump. The vacuum control senses vacuum levels in the vacuum system and in components of the milking system, excluding the vacuum regulator. The vacuum control increases or decreases the speed of the variable speed motor as required to increase or decrease the vacuum level. The sensing system detects the attaching of milking units to the milking system and causes the motor speed to increase increasing the vacuum level to match airflow. The sensing system detects completion of attaching of milking units to the milking system and reduces the speed of the motor decreasing the vacuum level.

FIG. 1, labeled Prior Art, depicts a known vacuum controlled system using a milk claw. In FIG. 1, a vacuum source shown by dashed box 20 produces a controlled vacuum by means of a motor 22 driving a vacuum pump 24 at a constant speed. The vacuum is maintained by state-of-the art vacuum regulator 28 which admits or bleeds air at atmospheric pressure into the vacuum system to correct and/or maintain the vacuum level. The vacuum regulator 28 is typically a vacuum controller which is used to mechanically regulate the vacuum levels, an example of which is the vacuum controller disclosed in U.S. Pat. No. 3,938,547.

The vacuum source 20 is used to provide a regulated vacuum to a milking system shown generally as 30. A typical milking system includes a vacuum reservoir 32, milking claws 34, having pulse controlled inflations 38, pulsator 40, appropriate vacuum control lines, milking lines and a collection vessel such as a milk jar 44. Such vacuum controlled milking systems are well known in the art and need not be described in detail herein.

FIG. 2 labeled Prior Art illustrates a known prior art apparatus for use as the vacuum source in lieu of the vacuum source 20 shown in FIG. 1. This vacuum source is likewise illustrated by dashed box 20 in FIG. 2. In FIG. 2, a vacuum pump 50 is driven by a three phase AC variable speed motor 52, the rotational speed of which is controlled by a variable frequency drive 56. In the prior art apparatus, a control device 60 is responsive to a vacuum transducer 64 which detects the absolute vacuum level and sends a signal representative of the absolute vacuum level to the control device 60 which is responsive thereto to vary the speed of the motor. A vacuum controller 68 is used to mechanically regulate the vacuum level.

The present invention relates to an improved vacuum controller for regulating the vacuum level and to a transducer which is adapted to be operatively connected to the vacuum controller for providing an output signal which represents an instantaneous position of the diaphragm, a valve and valve opening in the vacuum controller. The output signal is used to generate or produce, as the case may be, a control signal to control the speed of the AC variable speed motor driving the vacuum pump. In the Prior Art apparatus as illustrated in FIG. 2, the signal may be used to control the speed of the variable drive motor.

SUMMARY OF THE PRESENT INVENTION

The present invention discloses and teaches a new, novel and unique open loop control apparatus for a vacuum controlled system for providing vacuum stability within a predetermined range of vacuum levels. The control apparatus includes a vacuum regulator having a diaphragm including a valve member having a valve opening or input port which changes position as a function of the vacuum level within the vacuum system for controllably admitting or bleeding air into the vacuum system to adjust the vacuum level within the system. A transducer is operatively coupled to the diaphragm for producing an output signal which represents the instantaneous position of any one of the diaphragm, valve member, the valve opening or input port. A control device having a pair of inputs and an output, has applied to one of the pair of inputs a set point signal representing a programmed vacuum level for the system. Applied to the other of the pair of inputs of the control device is the output signal from the transducer representing the instantaneous position of the diaphragm. The control device produces, as its output signal, a control signal for controlling speed of a variable speed motor which drives a vacuum pump at various speed as required to enable the vacuum pump to maintain the vacuum level of the vacuum system within a predetermined range of vacuum levels.

A vacuum controller, as disclosed and described in U.S. Pat. No. 3,938,547, is used to mechanically regulate the vacuum level of a milking system by controlling the admission of or bleeding of air into the vacuum system. The vacuum controller includes a diaphragm assembly which mechanically controls the vacuum level through exhausting and in taking air through radial air ports and input ports with a valve member operatively connected to and moveable with the diaphragm. The mechanical resonance characteristics of the diaphragm assembly and related elements provide some mechanical damping such that relatively slow, but acceptable regulation, is achieved which controls the vacuum level in the milking system over a bandwidth of about 3 to 4 inches of Hg.

SUMMARY OF THE PRESENT INVENTION

The present invention discloses a new, novel and unique open loop control apparatus for a vacuum controlled system for providing vacuum stability within a predetermine range of vacuum levels. The open loop control apparatus includes a vacuum regulator having a diaphragm including a valve member having a valve opening which changes position as a function of the vacuum level within the vacuum system for controllably admitting or bleeding air into the vacuum system to adjust the vacuum level within the vacuum system. A transducer is operatively coupled to the diaphragm for producing an output signal which represents an instantaneous position of the valve opening. A control device having a pair of inputs and an output has applied to one of the pair of inputs a set point signal representing a programmed vacuum level for the vacuum system. Applied to the other of the pair of inputs is the output signal from the transducer representing an instantaneous position of the valve opening or input port. The control device produces or generates, on its output, a control signal for controlling speed of a variable speed motor which drives a vacuum pump at various speed to enable the vacuum pump to maintain the vacuum level of the vacuum system within a predetermined range of vacuum levels.

In the preferred embodiment of the present invention, the open loop control apparatus includes a transducer which is directly coupled to and moveable with the diaphragm of a vacuum controller. The transducer is, preferably, a linear stroke transducer which produces an analog voltage signal to represent the position of the diaphragm, valve, valve opening or input port. In the alternative, the transducer may produce a digital voltage signal as its output signal.

The known prior art vacuum controllers provide sufficient regulation of the vacuum levels with a range of 3 inches of Hg to 4 inches of Hg. However, as milking systems and milking claw performances are improved, the regulation of vacuum levels over a smaller range of fluctuations and vacuum levels becomes more important. Regulations of vacuum levels over a range of 0.5 inches of Hg to about 1.5 inches of Hg are now becoming the state-of-the-art. The state-of-the-art vacuum controllers cannot achieve this level of regulation of vacuum levels.

None of the known prior art anticipate, disclose, teach or suggest a vacuum regulator having a transducer or a linear stroke transducer operatively coupled thereto which produces an output signal which is used as an input to an open loop control system for a vacuum controlled milking system.

Therefore, one advantage of the open loop control system of the present invention is that the present vacuum controllers used in a vacuum controlled vacuum system can be adapted with a vacuum control apparatus for providing vacuum stability within a predetermined range of vacuum levels.

Another advantage of the present invention is that the vacuum controller provides energy conservation capability for a diary vacuum system by producing an output signal which is used to vary the speed of the vacuum pump to control vacuum levels while still continuing to maintain the existing precise vacuum regulation.

Another advantage of the present invention is that the open loop control can be used in a vacuum regulator having a diaphragm and valve member which changes position as a function of the vacuum level within the vacuum system for controllably admitting or bleeding air into the vacuum system to adjust the vacuum level within the vacuum system.

Another advantage is that the open loop control of the present invention can use a transducer operatively coupled to the diaphragm of a vacuum regulator for producing an output signal which represents an instantaneous position of the valve opening.

Another advantage is that the open loop control of the present invention can use an electronic simulator to simulate or represent the mechanical operation of a diaphragm of a vacuum regulator for producing an output signal which represents an instantaneous position of the simulated diaphragm and associated valve opening.

Another advantage is that the open loop control of the present invention can utilize a control circuit, which in the preferred embodiment is a comparator or electrical summing junction, having a pair of inputs and an output. One signal applied to one of the pair of inputs is a set point signal representing a programmed vacuum level for the vacuum system and the other signal applied to the other of the pair of inputs is the output signal from the transducer representing an instantaneous position of the valve opening. The output produced by the control device, such as the comparator or electrical summing junction, is used as a control signal for controlling speed of a variable speed AC motor which drives a vacuum pump at various speeds to enable the vacuum pump to maintain the vacuum level of the vacuum system within a predetermined range of vacuum levels.

Another advantage is that the open loop control of the present invention can utilize a transducer directly coupled to and moveable with the diaphragm. The transducer may be a linear stroke transducer which produces an analog voltage signal to represent the position of the diaphragm. The transducer may also be a low voltage digital transducer ("LVDT").

Another advantage is that the open loop control of the present invention can utilize a transducer which produces a digital signal as the output signal.

BRIEF DESCRIPTION OF THE DRAWINGS

The foregoing and other advantages of this invention will be apparent from the following description of the preferred embodiment of the invention when considered with the illustrations and accompanying drawings which include the following Figures.

DESCRIPTION OF THE PREFERRED EMBODIMENT

Figure 1:
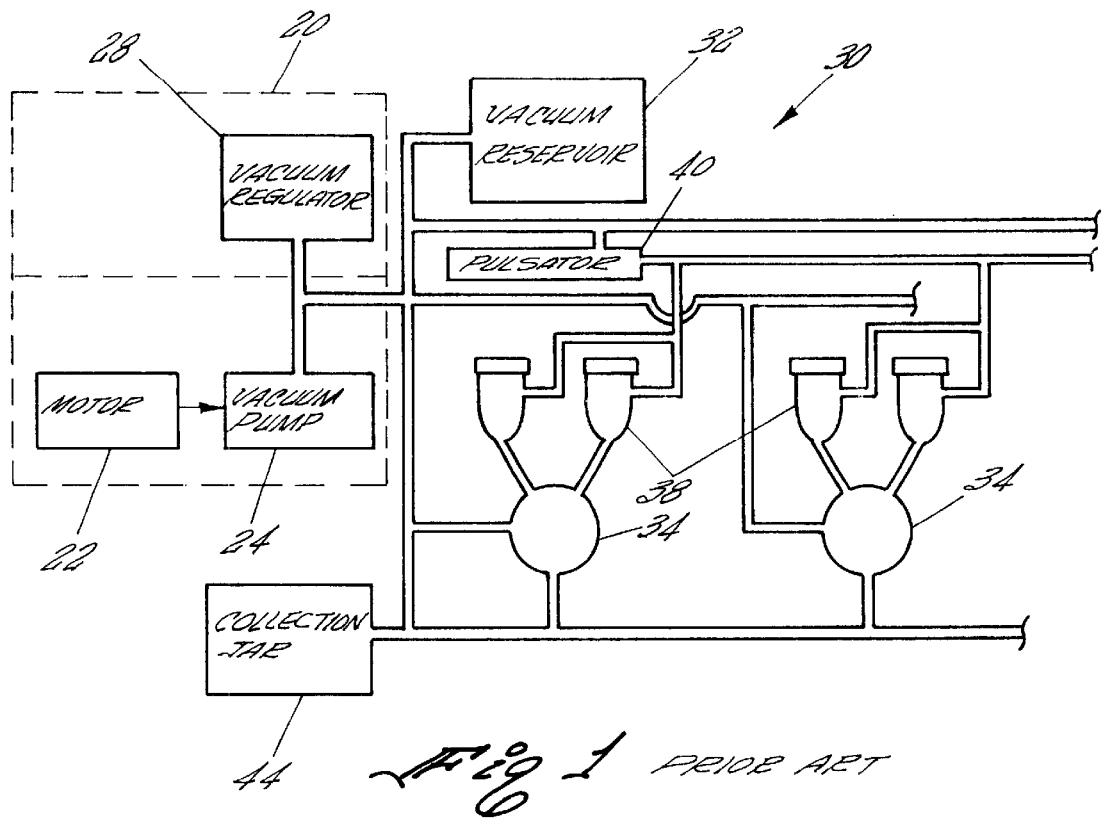
FIG. 1, labeled "Prior Art", depicts in a block diagram a typical milking system having a conventional vacuum source having a vacuum controller for regulating the vacuum level, and milking apparatus including milking claws, inflations and pulsator for controlling the vacuum level in the inflations with vacuum pulses which is well known in the art.
Figure 2:
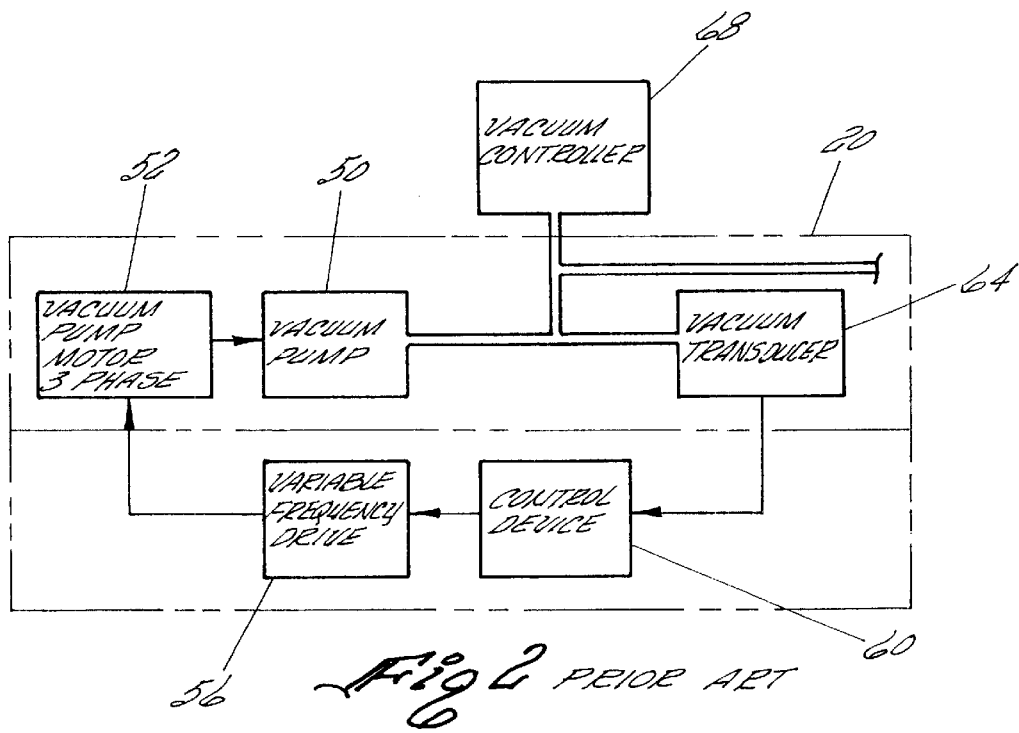
FIG. 2, labeled "Prior Art", depicts in a block diagram another type of prior art vacuum source adapted for use in a typical milking system illustrated in FIG. 1 wherein the vacuum is produced using a three phase, AC variable speed motor controlled by a variable frequency drive which is responsive to a control device having an input from a vacuum sensor that senses vacuum level and which includes a vacuum controller for regulating the vacuum level.

As discussed herein above, FIGS. 1 and 2, labeled Prior Art, depicts known vacuum controlled systems using a milk claw wherein the vacuum source is depicted by dashed box 20. In FIGS. 1 and 2, the vacuum source produces a controlled regulated vacuum using a state-of-the art vacuum regulator. The vacuum regulator is typically a vacuum controller which mechanically regulates the vacuum levels by movement of a diaphragm and valve relative to an air port to vent the vacuum to air to obtain an instantaneous adjustment of vacuum using air at atmospheric pressure, an example of which is the vacuum controller disclosed in U.S. Pat. No. 3,938,547.

The present invention provides an improved vacuum controller for regulating the vacuum level by use of a transducer which is adapted to be directly operatively connected to diaphragm of a vacuum controller for providing an output signal which represents the instantaneous position diaphragm and closing valve relative to an air port. The output signal is used to generate a control signal to control an AC variable speed motor driving the vacuum pump as a rapid second order adjustment of vacuum level, in addition to the first order adjustment provided by movement of the diaphragm and valve relative to an air port.

This control signal is used, in lieu of a signal from a vacuum level sensor of the prior art systems as illustrated in FIG. 2, to control the speed of the AC variable speed drive motor.

Figure 3:
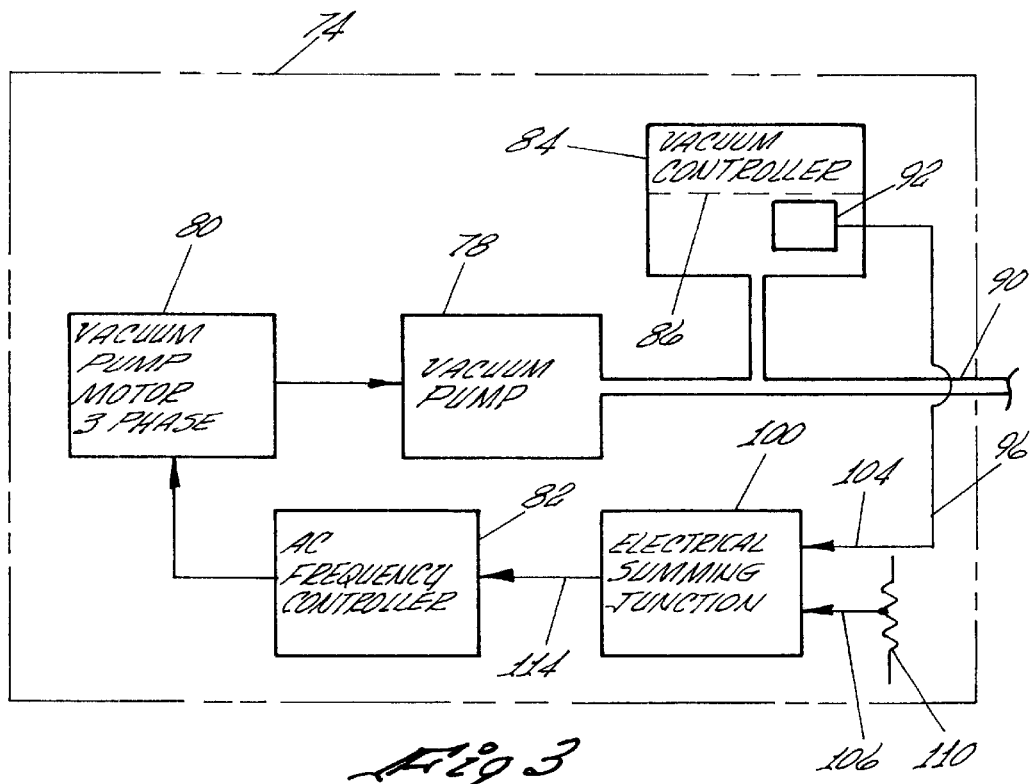
FIG. 3 is a block diagram illustrating one embodiment of the present invention wherein a transducer is operatively coupled to a diaphragm of a vacuum controller to produce an output signal representing an instantaneous position of the diaphragm, valve opening or input port.

The block diagram of FIG. 3 illustrates one embodiment of the present invention wherein the vacuum source is shown by dashed box 74. The vacuum source includes a typical vacuum pump 78 which is driven by a three phrase AC variable speed electric motor 80 which is controlled by an AC frequency controller 82. A vacuum controller 84 having a diaphragm and valve for opening and closing air ports to provide instantaneous adjustment to vacuum level using ambient air pressure depicted by dashed line 86 is operatively connect to a vacuum line 90 extending from the vacuum source 74. A transducer 96 is operatively coupled to the diaphragm 86 of vacuum controller 84 to produce an output signal on lead 96 representing an instantaneous position of the diaphragm 86. The output signal is applied to a control device, which in this embodiment is a summing device 100, which has two inputs 104 and 106. The output signal is applied to input 104 of the electrical summing circuit 100. The other input 106 is received from a reference circuit depicted by variable resistor 110. The electrical summing circuit 100 performs a predetermined operation on the two input signals, such as for example generates or produces a signal which is developed form a comparison of the signal, or a sum of the signals or a difference between the signals or other programmed operation, to generate a control signal which is applied to output lead 114. Lead 114 applies the control signal to the AC frequency controller circuit to adjust the speed of the AC variable speed motor in a predetermined direction and subsequently, the vacuum level by virtue of an adjustment of the speed of the vacuum pump being driven by the motor.

Figure 4:
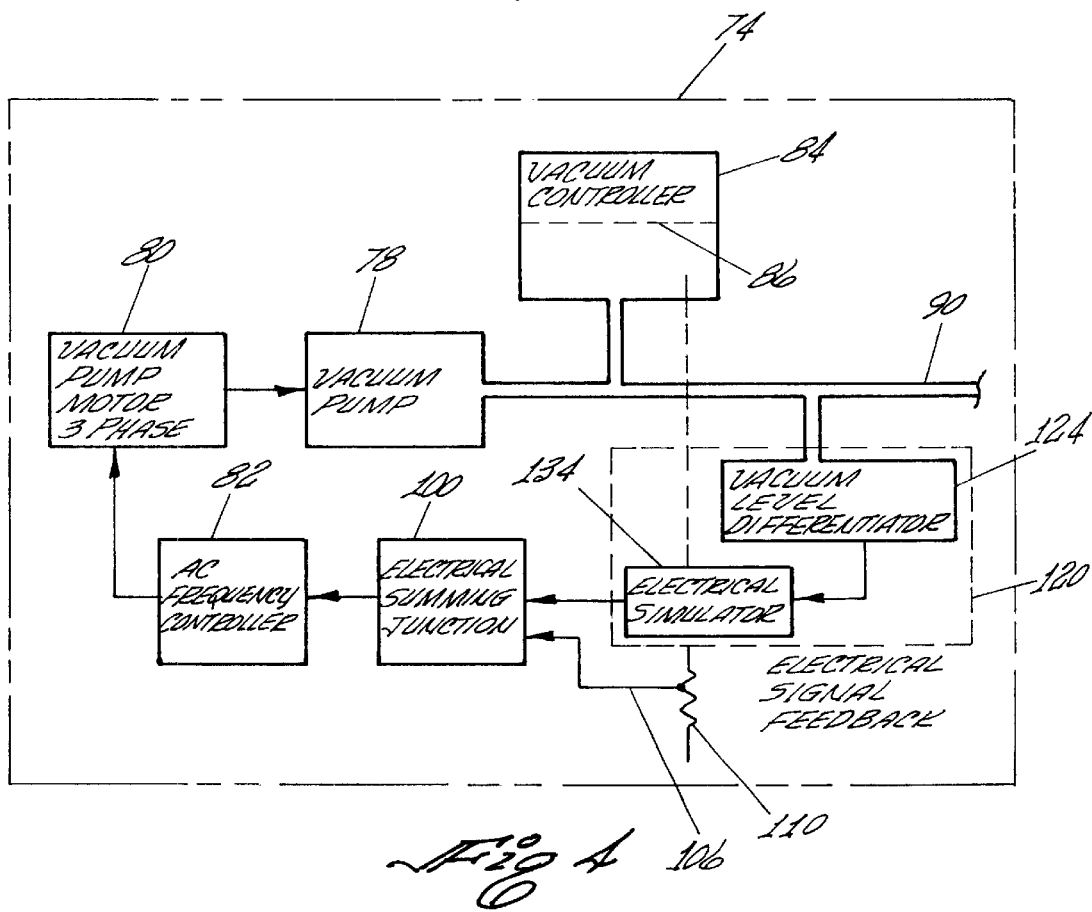
FIG. 4 is a block diagram illustrating another embodiment of the present invention wherein a vacuum level sensor is operatively coupled to an electronic simulator which electrically produces an output signal representing an instantaneous position of the diaphragm including the valve opening.

The block diagram of FIG. 4 illustrates another embodiment of the present invention wherein the vacuum source has vacuum pump 78, a vacuum pump motor 80, an AC frequency controller 82, a vacuum line 90, an electrical summing junction 100, a reference source 106 and a vacuum controller 86, all of which are similar to the elements having the same numerals as illustrated in FIG. 3.

In addition, FIG. 4 has an electronic simulator 120 which is operatively connected to a vacuum level differentiator 124 to sense the rate of change of vacuum level. The rate of change signal is applied to an electrical simulator device 130 to generate an output signal from the rate of change of the vacuum level. The simulator 134 may be used in lieu of directly sensing the mechanical position of the diaphragm 86 in the vacuum controller.

The vacuum controller provides a first adjustment to vacuum level using ambient air and valving of the ports to the ambient air. The control device provides a second adjustment derived from the diaphragm or from the rate of change of the vacuum level. The control device varies the three-phase AC variable motor speed and subsequently the vacuum level by variance of the AC variable speed motor varying the vacuum pump speed.

Figure 5:
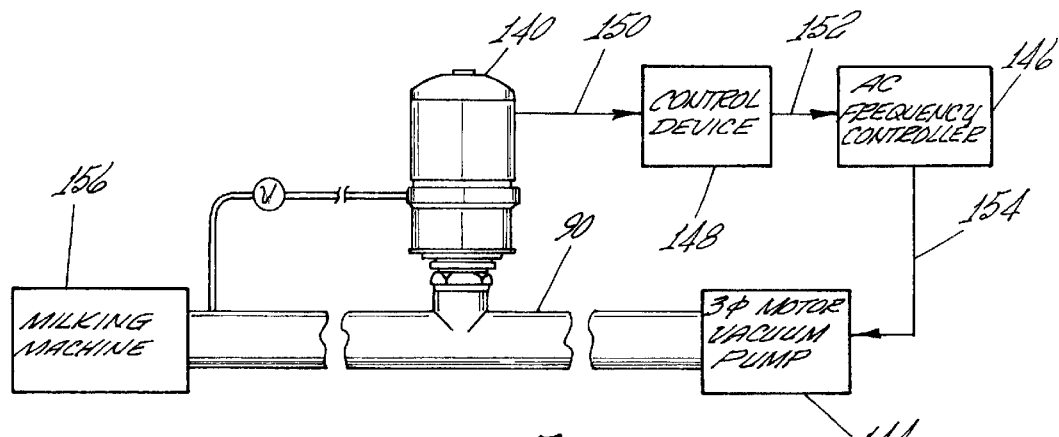
FIG. 5 is a partial pictorial and block diagram illustrating a vacuum controller having a linear stroke transducer operatively coupled to the diaphragm to produce an output signal representing an instantaneous position of the diaphragm to control the speed of a three phase AC variable speed motor for driving a vacuum pump at various speeds to provide an immediate change in motor speed to provide for an accelerated adjustment in vacuum level in response to the output signal produced by the transducer.

The partial pictorial and block diagram of FIG. 5 illustrates a vacuum controller 140 operatively connected to a vacuum line 90. Vacuum line 90 carries a vacuum from a vacuum source, such as a three phase AC variable speed drive motor driving a vacuum pump 144 controlled by an AC frequency converter 146 which is responsive to a control device 148. The control device 148 is responsive to a linear stroke transducer, such as linear stroke transducer 176 shown in FIG. 6, which generates an output signal on lead 150. The control device 148 is responsive to produce a control signal which is applied by lead 152 to the AC frequency converter 146. The AC frequency converter 146 applies an appropriate speed-adjusting signal to the three-phase AC variable speed motor and vacuum pump via lead 154.

The vacuum controller provides an instantaneous adjustment of the vacuum level as a function of the mechanical characteristics of the diaphragm while the control source is responsive to the linear stroke transducer operatively coupled to the diaphragm and valve to produce an output signal representing an instantaneous position of the diaphragm and valve to control the speed of a three phase AC variable frequency motor for driving a vacuum pump represented by element 144.

The vacuum line applies the regulated vacuum level to a milking machine or milking system depicted by element 156.

Figure 6:
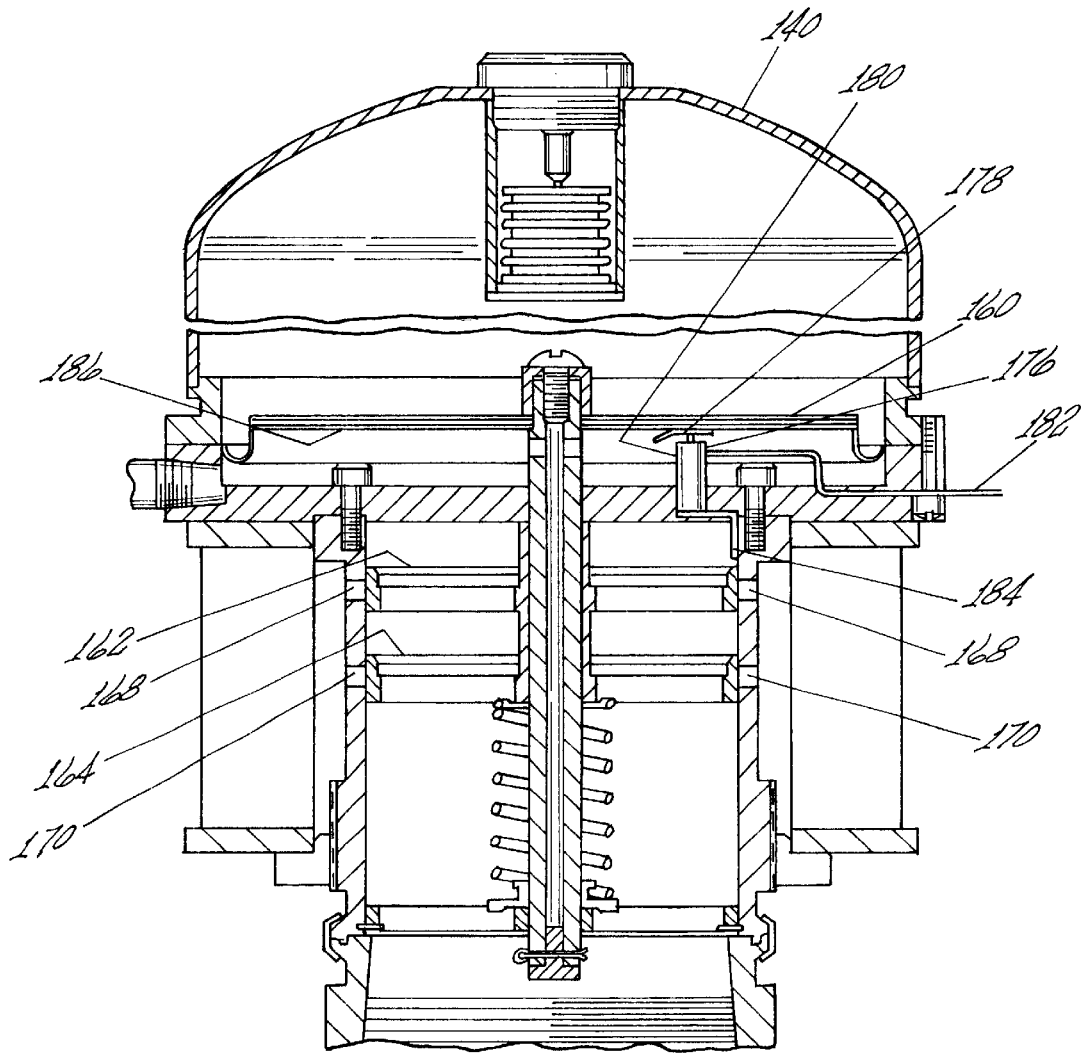
FIG. 6 is a partial front elevational cross-sectional view of a state-of-the art vacuum controller having a linear transducer operatively mounted to engage the bottom surface of the diaphragm for sensing an instantaneous position of the diaphragm.

The partial front elevational cross-sectional view of FIG. 6 illustrates a state-of-the art vacuum controller 140, the operation of which is described in detail in U.S. Pat. No. 3,938,547.

Of importance for an understanding of the present invention is that the diaphragm 160 has a pair of valve wheel rims 162 and 164 defining a valve opening or input port which are transported by movement of the diaphragm 160 relative to air ports 168 and 170.

A linear stroke transducer 176 having a plunger 178, which is moveable within a transducer housing 180, is used to generate an output signal on lead 180 which depicts an instantaneous position of the diaphragm including the position of the valve wheels 162 and 164, or valve openings, relative to the air ports 168 and 170. The linear transducer 176 is mounted onto a bracket depicted as element 180 within the vacuum controller housing. The linear stroke transducer 176 is positioned to be operatively mounted within the body of the controller so to enable the plunger 178 to engage the bottom surface 186 of the diaphragm 178 for sensing the instantaneous position of the diaphragm 178 as described herein.

FIGS. 7A, 7B, 7C and 7D are a series of diagrammatic views illustrating of another embodiment of the present invention with a linear stroke transducer operatively mounted to engage the top surface of the diaphragm. Common numbers for the elements are used in FIGS. 7A, 7B, 7C and 7D The vacuum controller of FIGS. 7A, 7B, 7C and 7D is shown diagrammatically and is depicted generally as 190. The vacuum controller is operatively coupled to a vacuum line through inlet 188. The vacuum controller 190 has a body 192 having at least one air port 194 formed therein, it being noted that two air ports 194 are illustrated as an example. The diaphragm 196 is slideably located with the body 192 and moves axially in response to the vacuum level of the vacuum applied thereto through inlet 188 in a manner similar to the operation of diaphragm 160 in FIG. 6. The diaphragm 196 has an annular shaped, circumferentially vertically extending valve member 198. The valve member 198 has at least one valve opening or input port 200, it being noted that two air ports 200 are illustrated as an example. The input ports 200 are positioned so as to be transported by axial movement of the diaphragm and valve member into and out of communication with the air ports 194.

A linear stroke transducer 202 has a plunger 206 which moves within a transducer housing 208. The linear stroke transducer 202 senses an instantaneous position of the diaphragm 196.

Figure 7:
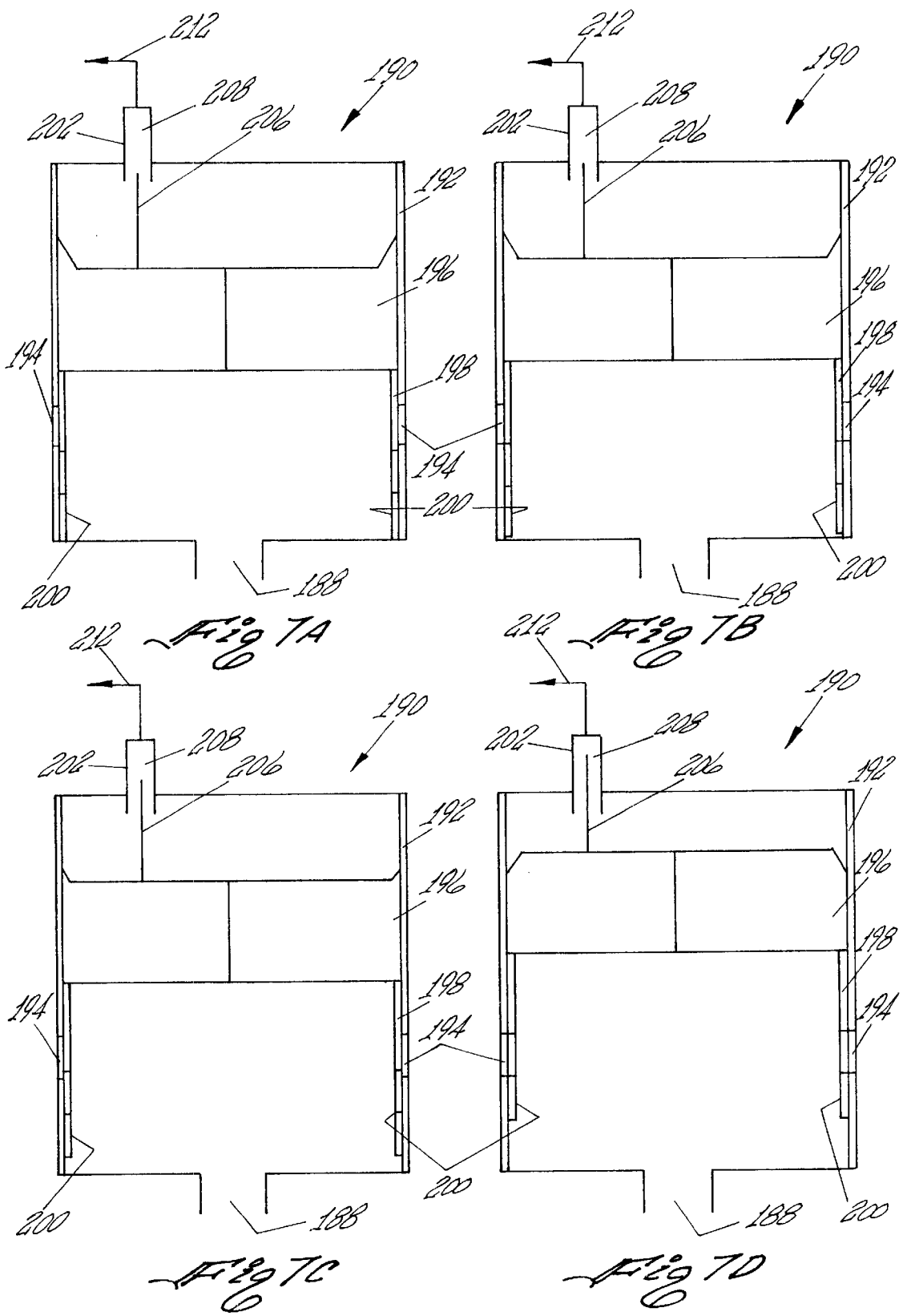
FIGS. 7A, 7B, 7C and 7D are a series of diagrammatic views illustrating another embodiment of the present invention with a linear stroke transducer is operatively mounted to and engages the top surface of the diaphragm for sensing an instantaneous position of the diaphragm and associate valve opening and that illustrates the positions of linear stroke transducer and of the valve member of the diaphragm relative to an air port for: (i) the valve member closing the air port with an overlap beyond the air port; (ii) the valve member closing the air port with no overlap beyond the air port; (iii) the valve member partially open relative to the air port; and (iv) the valve member fully open relative to the air port, respectively.

In FIG. 7A, the position of plunger 206 of the linear transducer 202 is illustrated to be nearly outside of the transducer housing 208. In this position, the diaphragm 196 and valve member 198 including input port 200 are located beyond and overtravels the air port 194 such that the valve member 198 closes the air port 194 and overlaps beyond the air port 194 and positions the input ports 200 beyond air ports 194. In this position, no ambient air at atmospheric pressure in admitted or bled into the vacuum controller 190. This represents the fully closed position of the valve 198.

In FIG. 7B, the position of plunger 206 of the linear stroke transducer 202 is illustrated to be slightly inside of the transducer housing 208. In this position, the diaphragm 196 and valve member 198 including input ports 200 are positioned relative to an air port such that the valve member 198 closes the air port 194 with no overlap beyond the air ports 194 and positions the input ports 200 adjacent air ports 194. In this position, no ambient air at atmospheric pressure in admitted into or bled into the vacuum controller 190.

In FIG. 7C, the position of plunger 206 of the linear stroke transducer 202 is illustrated to be further inside of the transducer housing 208. In this position, the diaphragm 196 and valve member 198 including input ports 200 are positioned relative to an air port such that the valve member 198 partially opens the air port 194 and positions the input ports 200 into partial communication with air ports 194. In this position, a controlled amount of ambient air at atmospheric pressure in admitted into the vacuum controller 190.

In FIG. 7D, the position of plunger 206 of the linear stroke transducer 202 is illustrated to be almost completely inside of the transducer housing 208. In this position, the diaphragm 196 and valve member 198 including input ports 200 are positioned relative to an air port such that the valve member 198 fully opens the air port 194 and positions the input ports 200 into alignment with and in full communication with air ports 194. In this position, ambient air at atmospheric pressure in admitted into or bleed into the vacuum controller 190, the amount of which is determined by the diameters of the air ports 194 and the input ports 200. In the preferred embodiment, the diameters are substantially the same. This represents the fully opened position of valve 198.

As is apparent from the description of FIGS. 7A through 7D, a linear stroke transducer 202 is operatively coupled to the diaphragm 196. In the preferred embodiment, the linear transducer 202 may be a low voltage digital transducer ("LVDT") 202.

In this embodiment, the LVDT 202 is used to sense valve position. The LVDT 202 has a 10 mm (0.390 inches) active length. The range of the output voltages is from about 0.25 volts to about 3.7 volts. The LVDT 202 is assembled into the diaphragm 196 such that the voltage rises as the valve 198 closes. The valve travel, axially, is about 0.250 inches from the fully closed position to fully opened position. The valve 196 has 0.060 inches of closed overtravel.

The valve 196 has 0.060 inches of overtravel in the closed position before it hits a positive stop. The overall travel length of the valve is 0.310 inches. The LVDT 202 is positioned on the diaphragm 196 such that the total valve travel of 0.310 inches is centered in the LVDT's 202 active length of 0.394 inches. This results in an excess travel of 0.042 inches at each end if the LVDT is properly positioned.

Since the LVDT 202 active length is 10 mm (0.310 inches) and its voltage range is about 3.45 volts (3.7 volts less 0.25 volts), the gain of the LVDT is approximately 8.763 volts per inch (0.345 volts per mm).

When the valve 202 is fully closed (needs more vacuum), the output of the LVDT 202 rises which causes the drive to run at maximum speed (60 hertz). When the valve has opened 1 mm, the LVDT 202 output drops to a point such that the drive will be running a minimum speed (needs less vacuum). In this embodiment, the valve 196 has 0.060 inches of closed overtravel and the output of the LVDT 202 will continue to rise. As such, the drive continues to run at maximum speed.

The position of the LVDT needs to be calibrated and this may be accomplished by determining the fully closed voltage from the LVDT 202 prior to operation. Typically after calibration, the operating voltage of the LVDT 202 is about 3.332 volts when the valve is full closed and is about 2.464 volts when the valve is 1 mm open.

Figure 8:
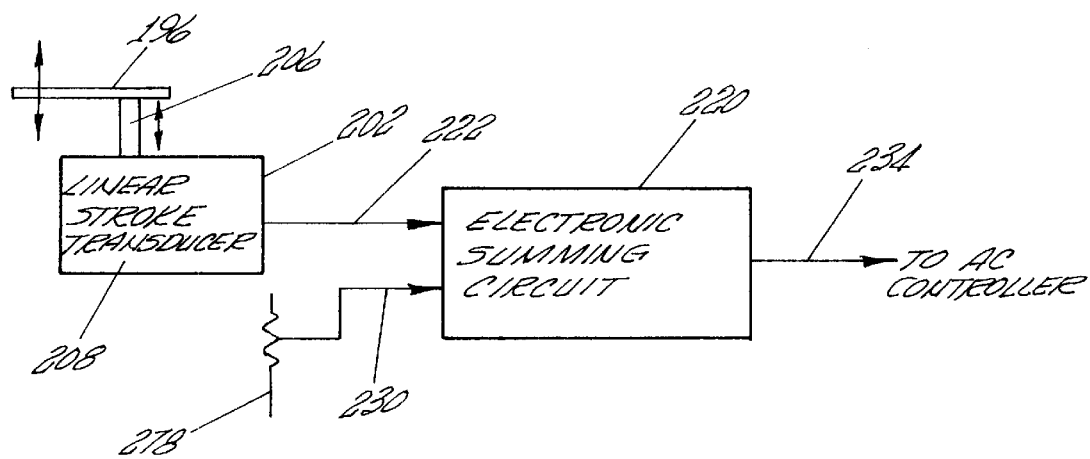
FIG. 8 is a block diagram illustrating a linear stroke transducer operatively coupled to and for sensing e diaphragm position for generating an output signal which is applied to a summing circuit to produce and output signal which is applied an AC variable frequency controller of an AC variable speed motor driving a vacuum pump.

The block diagram of FIG. 8 illustrates a schematic diagram of a modification of the embodiment of FIGS. 7A through 7D wherein the plunger 206 of the linear stroke transducer 202 is operatively coupled to the bottom of the diaphragm 196 and moves downward into the transducer housing 208. This is opposite to the structure of FIGS. 7A through 7D where the plunger 202 is operatively coupled to the top of the diaphragm 196 as illustrated in FIGS. 7A through 7D and the plunger 202 moves upwardly into the transducer housing 208. The linear stroke transducer 202 is operatively coupled to sense the position of diaphragm 196 and for generating an output signal which is applied to an electronic summing circuit 220 via lead 222. The other input to the electronic summing circuit 220 is from a reference source 228 which is applied to the electronic summing circuit 220 via lead 230. The electronic summing circuit 220 produces and output signal which is applied an AC variable frequency controller for controlling an AC variable speed motor driving a vacuum pump as depicted by arrow 234.

Figure 9:
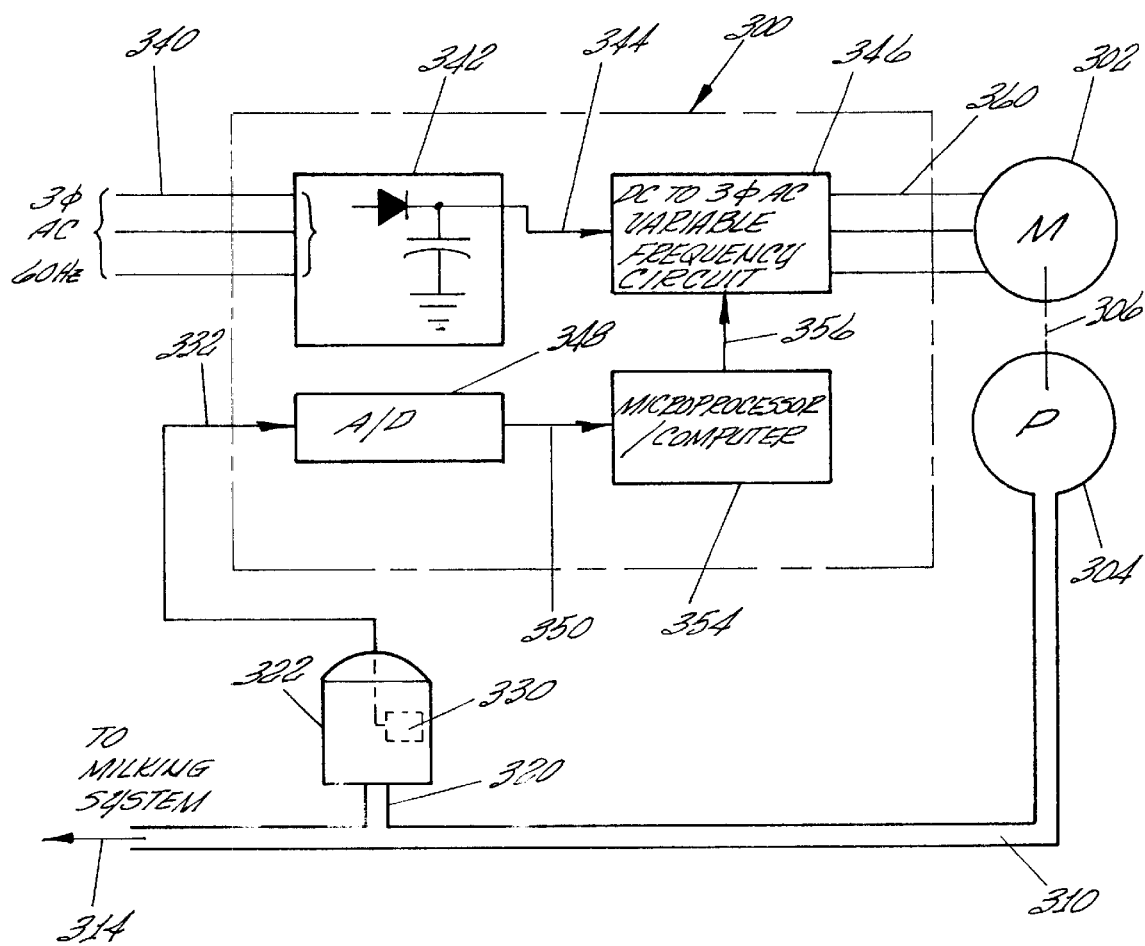
FIG. 9 is a block diagram illustrating a vacuum control system having a microprocessor which uses the teachings of the present invention for precisely controlling the vacuum levels of a vacuum regulated milking system.

The block diagram of FIG. 9 illustrates a vacuum control system 300 having a computer, which in the preferred embodiment is a microprocessor, which uses the teachings of the present invention for precisely controlling the vacuum levels of a vacuum regulated milking system. The typical application includes a three-phase AC variable speed motor 302 which varies between a frequency of 30 hertz at minimum speed and 60 hertz at maximum speed. The motor 302 drives a vacuum pump 304 via a drive member depicted by dashed line 306. The speed of the vacuum pump 304 is determined by the speed of the motor 302. The faster the motor 302 drives the vacuum pump 304, the greater the vacuum produced by the vacuum pump for the vacuum system. Conversely, the slower the motor 302 drives the vacuum pump 304, the vacuum produced by the vacuum pump for the vacuum system becomes lower.

The vacuum pump 304 is operatively connect to a vacuum line 310 for applying vacuum to a vacuum system for a milking system depicted by arrow 314. The vacuum applied is applied to a vacuum system the vacuum is typically used to: (a) provide vacuum to move milk from a milking parlor to a bulk tank; and (b) to provide vacuum for pulsators on individual cow milking machines. The details of the milking system are disclosed in FIG. 1.

A vacuum controller 320 is operatively connected to the vacuum line 310 and receives vacuum from the vacuum line via input 320. The vacuum controller includes a transducer depicted by 330 for producing an output signal on lead 332 which is an input to the vacuum control system 300.

A 3 phase, 60 hertz, AC voltage shown by arrow 340 is also used as an input to the vacuum control system 300. The AC voltage 340 is applied as an input to a rectifier 342 which converts the AC voltge to a DC voltage. The DC voltage is applied via conductors 344 to a DC to 3 phrase AC variable frequency circuit 346 which is used to adjust the speed of the AC variable speed motor 302.

Concurrently, the vacuum controller 322 performs two functions. The first function is to have the diaphragm be mechanically responsive to the vacuum level by bleeding air into the vacuum to maintain the correct vacuum setpoint.

The second function is to produce an output signal which is used as an input to the vacuum control system 300 and as an input specifically to an analog to digital (A/D) converter 348. The output from the A/D converter 348 is applied via lead 350 to a microprocessor/computer 354 for responding to the output signal to produce a control signal which is applied to the DC to three phase AC variable frquency control 346 to adjust the speed of the AC variable speed motor as required.

As discussed herein in connection with FIG. 4, an electrical simulation circuit can be used to electrically simulate the mechanical response of the vacuum controller's diaphragm. The input to the electrical simulation circuit may be derived from a differential vacuum detector which senses the rate of change of the vacuum level. This is a significantly different than a control circuit which responds to an absolute vacuum level.

Figure 10:
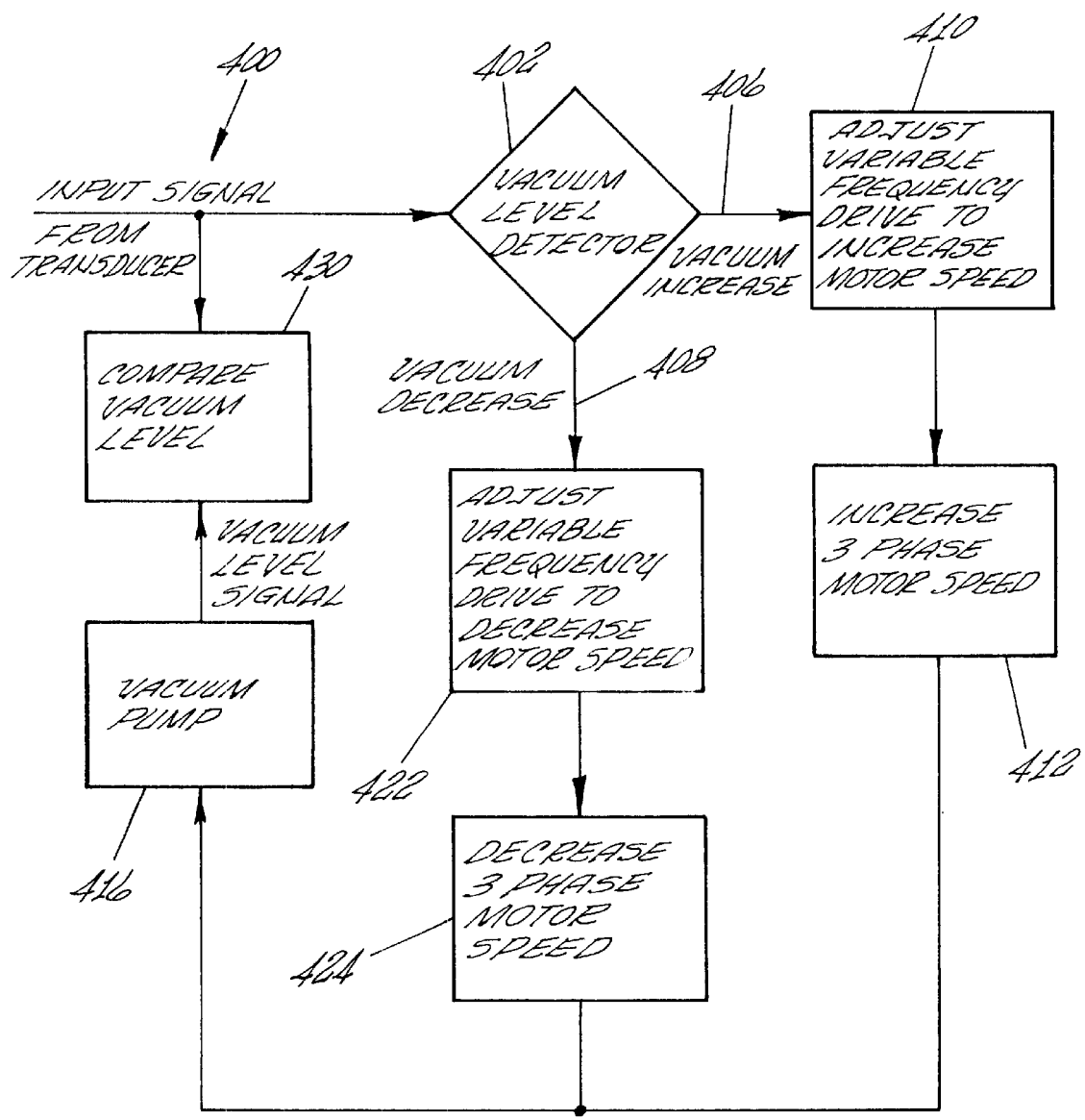
FIG. 10 is a software flow chart showing steps of a method for regulating the vacuum level in a vacuum system in response to an output signal from a transducer to control the AC variable frequency control used to control and drive an AC variable speed motor to adjust motor speed and vacuum pump speed as required to regulate vacuum levels in response to an instantaneous position of or simulated instantaneous position of a diaphragm and its associated valve opening.

The software flow chart of FIG. 10 shows the steps of a method regulating the vacuum level in a vacuum system in response to an output signal from a transducer to control the AC variable frequency drive for driving an AC variable speed motor. The AC variable frequency drive is used to adjust motor speed and the vacuum pump speed as required to regulate vacuum level in response to the instantaneous position of or simulated instantaneous position of a diaphragm in a vacuum controller.

The beginning step of the method is generating an input signal from a transducer from a vacuum controller representing the instantaneous position of the diaphragm shown by 400.

The input signal is applied to a vacuum level detector or control device shown as step 402. The vacuum level detector or control device in step 402 makes a determination as to whether the vacuum level should be increased, shown as step 406, or decreased, shown as step 408.

If the decision is to increase vacuum, as shown by 406, then the input signal is used to generate a control signal that is applied to adjust AC variable frequency drive 410 to increase speed of the AC variable speed motor 412 which increases the speed of the vacuum pump 416 to increase the vacuum level.

If the decision is to decrease vacuum, as shown by 408, then the input signal is used to generate a control signal that is applied to adjust the AC variable frequency drive 422 to decrease sped of the AC variable speed motor speed 424 to decrease the speed of the vacuum pump 416 to decrease the vacuum level.

The vacuum level is adjusted until a set point is reached as, depicted by step 430, preferably by using a control circuit such as for example, a comparison circuit.

In addition to the adjustment of the vacuum level by adjusting the vacuum pump speed, an instantaneous adjustment is made to the vacuum level by the vacuum controller as discussed herein above.

The above invention provides an improved apparatus and method for maintaining precise vacuum control in a diary milking system to minimize Mastitis, which is an infection of the mammary glands of diary animals. Typically Mastitis is often caused by pressure changes within a milking claw which propels bacteria into the teat sphincter and, in turn, into the mammary gland.

By using the teachings of the present inventions, the vacuum stability within the milking system is improved and results in a much narrower band of vacuum fluctuations under normal ranges of milk flow and milking hose elevations.

Typically, the vacuum system vacuum level are about 12 inches Hg (12" Hg). Upon commencement of milking, the vacuum levels drop down to about 10 inches Hg (10" Hg) with peak-to-peak excursions having amplitudes varying between approximately 0.5 inches Hg (0.5" Hg) and 1.5 inches Hg (1.5" Hg). The peak-to-peak excursions of vacuum level are caused by the flooding of the milk claw and milk hose which interrupts the vacuum.

As the milk flow decreases towards the end of a milking cycle, the vacuum level again approaches the initial vacuum level of 12 inches Hg (12" Hg) until the end of the milking cycle.

The present invention effectively reduces the vacuum levels drop to less that 10 inches Hg (10" Hg) and reduces the peak-to-peak excursions amplitudes to less than the approximately 0.5 inches Hg (0.5" Hg) and 1.5 inches Hg (1.5" Hg).

EXAMPLE

The following is an example of a field test of an open loop control apparatus using the teachings of the present invention.

(1) The following test purpose was to test for fluctuation levels at various cubic foot per minute ("CFM") leaks.
(2) Calibration Voltage (Normal)=0.3235 VDC.
(3) Offset established with only reserve CFM for test bench purposes.
(4) Span established with no barn consumption CFM.
(5) Offset
   Code 1 0.01 VDC=0.254 mm=8 CFM
   Code 2 0.02 VDC=0.865 mm=25 CFM
(5) Span
   Code 6 1.25 VDC=0.635 mm=20 CFM
   Code 7 1.50 VDC=0.965 mm=30 CFM
   Code 8 2.00 VDC=1.180 mm=40 CFM

| Conditions | Code | 10 CFM | 20 CFM | 30 CFM | 40 CFM |
|---|---|---|---|---|---|
| Sentinel-85 CFM reserve | Normal | 0.26 | 0.48 | 0.64 | 0.68 |
| 1 second acceleration; 15 second deceleration | Offset-Span | | | | |
| | 1-6 | 0.27 | 0.59 | 0.88 | 1.05 |
| | 1-7 | 0.42 | 0.58 | 0.83 | 0.89 |
| | 1-8 | 0.45 | 0.53 | 0.66 | 0.73 |
| | 1-6 | 0.27 | 0.58 | 0.88 | 1.50 |
| | 1-7 | 0.40 | 0.63 | 0.82 | 0.91 |
| | 1-8 | 0.28 | 0.51 | 0.65 | 0.73 |
| | 2-6 | 0.29 | 0.55 | 0.85 | 0.95 |
| | 2-7 | 0.45 | 0.63 | 0.80 | 0.91 |
| | 2-8 | 0.42 | 0.45 | 0.67 | 0.73 |
| | 2-6 | 0.39 | 0.63 | 0.81 | 0.93 |
| | 2-7 | 0.42 | 0.60 | 0.78 | 0.89 |
| | 2-8 | 0.28 | 0.53 | 0.64 | 0.74 |
| 1 second acceleration; 10 second deceleration | Offset-Span | | | | |
| | 1-6 | 0.27 | 0.59 | 0.80 | 0.99 |
| | 1-7 | 0.47 | 0.66 | 0.82 | 0.90 |
| | 1-8 | 0.38 | 0.47 | 0.58 | 0.71 |
| | 2-6 | 0.44 | 0.58 | 0.78 | 0.94 |
| | 2-7 | 0.47 | 0.58 | 0.78 | 0.86 |
| | 2-8 | 0.38 | 0.48 | 0.59 | 0.70 |

-continued

| Conditions | Code | 10 CFM | 20 CFM | 30 CFM | 40 CFM |
|---|---|---|---|---|---|
| 1 second acceleration; 5 second deceleration | Offset-Span | | | | |
| | 1-6 | 0.43 | 0.57 | 0.83 | 1.05 |
| | 1-7 | 0.46 | 0.64 | 0.78 | 0.89 |
| | 1-8 | 0.39 | 0.50 | 0.60 | 0.73 |
| | 2-6 | 0.45 | 0.56 | 0.77 | 0.90 |
| | 2-7 | 0.49 | 0.60 | 0.81 | 0.89 |
| | 2-8 | 0.33 | 0.50 | 0.61 | 0.68 |

The above example discloses that at a higher deceleration, there is more overshoot. The minimum overshoots occurred at the 1-second acceleration and 5 second deceleration test.

If the teaching of the present invention are combined with a milking claw having an outlet opening of about $9/16^{th}$ of an inch or 0.75 inches or greater, then the peak-to-peak excursions amplitudes can be reduced to approximately about 0.5 inches Hg (0.5" Hg) and about 0.75 inches Hg (0.75" Hg).

Further, improved vacuum stability within acceptable ranges as described above may have subtle benefits that enable more rapid, gentle and complete milk out.

It is envisioned that the teachings of the present invention may be combined with an improved vacuum controller having a transducer integrated therein such that the fluctuations in vacuum levels are reduced thereby reducing the fluctuations of the vacuum pump. By reducing the necessity of adjustment of the speed of the three phase AC variable speed motor used to drive the vacuum pump over a range of speeds, less electrical energy is used resulting in conservation of energy for the diary vacuum system and user thereof.

It is further envisioned that other embodiments of a vacuum control system using the teachings of the present invention could be developed by combining the instantaneous mechanical adjustment of the vacuum level afforded by the mechanical response characteristics of a diaphragm with an electrically determined rapid adjustment to anticipate the changes required in controlling vacuum levels. This would include controlling the amount or magnitude of overshoot in adjusting the vacuum level in a single direction that then requires an additional adjustment to offset the magnitude of the overshooting of the required vacuum level back to the required or programmed vacuum level.

All such variations and incorporating of the teachings of present invention are envisioned to be covered by and anticipated by the teachings set forth herein.

What is claimed is:

1. An open loop control apparatus for a vacuum system for providing vacuum stability within a predetermined range of vacuum levels comprising
   a vacuum regulator having a diaphragm including a valve member having a valve opening which changes position as a function of vacuum levels for controllably bleeding air into the vacuum system to adjust the vacuum level within a predetermined range of vacuum levels;
   a transducer operatively coupled to said diaphragm for producing an output signal which represents an instantaneous position of the valve opening and wherein said transducer is a low voltage digital transducer; and
   a control device having a pair of inputs and an output, said control device having applied to one of said pair of inputs a set point signal representing a programmed vacuum level for the vacuum system and having applied to the other of said pair of inputs the output signal from said transducer representing an instantaneous position of the diaphragm, said control device producing on its output a control signal for controlling speed of a variable speed motor which drives a vacuum pump at various speeds to maintain the vacuum level within a predetermined range of vacuum levels.

2. The open loop control apparatus of claim 1 wherein said transducer is directly coupled to and moveable with the diaphragm.

3. The open loop control apparatus of claim 1 wherein said transducer produces an analog signal to represent the position of the valve opening.

4. The open loop control apparatus of claim 1 wherein said transducer produces a digital signal to represent the position of the valve opening.

5. The open loop control apparatus of claim 1 wherein said transducer is a linear stroke transducer.

6. The open loop control apparatus of claim 5 wherein said linear stroke transducer produces an analog voltage signal to represent the position of the valve opening.

7. The open loop control apparatus of claim 5 wherein said linear stroke transducer produces a digital voltage signal to represent the position of the valve opening.

8. The vacuum regulating apparatus of claim 1 further comprising
   a comparator having a pair of inputs and an output, said comparator having applied thereto on one of said pair of inputs a set point signal representing a programmed vacuum level for the vacuum system and having applied to the other of said pair of inputs the output signal from said transducer representing an instantaneous position of the valve opening, said comparator producing on its output a control signal for controlling speed of a variable speed motor which drives a vacuum pump at various speeds to maintain the vacuum level of the vacuum system within a predetermined range of vacuum levels.

9. A method for regulating a vacuum level within a predetermined range of vacuum levels comprising the steps of:
   providing an open loop feedback control apparatus for a vacuum system according to claim 4;
   controllably bleeding air from the vacuum regulator having a diaphragm including a valve member which changes position as a function of vacuum levels to adjust the vacuum level within said predetermined range of vacuum levels; and
   producing with the transducer operatively coupled to said diaphragm an output signal which represents an instantaneous position of the diaphragm.

10. The method of claim 9 further comprising the step of:
   generating with a control device having applied thereto as one input a set point signal representing a programmed vacuum level and having applied thereto as another input the output signal from said transducer a control signal.

11. The method of claim 10 further comprising the step of:
   controlling in response to the control signal the speed of a variable speed motor which drives a vacuum pump at various speeds to maintain the vacuum level within said predetermined range of vacuum levels.

12. A vacuum control system for providing vacuum stability within a predetermine range of vacuum levels comprising
   a regulator including at least one of a diaphragm having a known mechanical response including a valve member having an input port which changes position as a function of the vacuum level within the vacuum system for controllably bleeding air into the vacuum system to adjust the vacuum level and an electrical simulation device for simulating the mechanical response of a said diaphram;

a transducer operatively coupled to at least one of said diaphragm for producing an output signal which represents at least one of an instantaneous position of the input port and a differential vacuum level sensor for sensing rate of change of the vacuum level; and a control device having as one input a set point signal representing a programmed vacuum level and having applied as another input the output signal, said control device producing a control signal for controlling speed of a variable speed motor which drives a vacuum pump at various speed to enable the vacuum pump to maintain the vacuum within a predetermined range of vacuum levels.

13. A system comprising a vacuum line;

a source of three phase AC voltage;

a three phase variable speed AC motor;

a vacuum pump operatively coupled to AC motor for producing and applying a vacuum to the vacuum line;

a vacuum controller;

a vacuum regulator operatively coupled to said vacuum line, said vacuum regulator having a diaphragm including a valve member having an input port which changes position as a function of vacuum levels within the vacuum line a vacuum system for controllably bleeding air into the vacuum line to adjust the vacuum level, said vacuum regualtor further including a transducer operatively coupled to said diaphragm for producing an output signal which represents an instantaneous position of the input port;

a vacuum control apparatus having
- a rectifier operatively connected to said source of three phase AC voltage for producing a direct current voltage;
- a direct current to three phase AC variable frequency circuit operatively connect to said rectifier to receive said direct current voltage 1 and to said AC motor to adjust the speed thereof in response to said AC variable frequency circuit;
- an analog to digital converter operatively coupled to said vacuum controller for receiving said output signal and producing a digital voltage signal in response thereto; and
- a computer operatively coupled to said analog to digital converter to receive said digital voltage signal and responding thereto to produce a control signal which is applied to said AC variable frequency circuit operatively connect to adjust the speed thereof and of the vacuum pump in a direction to adjust the vacuum level as required to maintain the vacuum level of the vacuum line within a predetermined range of vacuum levels.

14. The system of claim 13 wherein said computer is a microprocessor.

15. The system of claim 14 wherein said transducer is a linear stroke transducer.

* * * * *